United States Patent
Hullinger et al.

(10) Patent No.: US 6,295,092 B1
(45) Date of Patent: Sep. 25, 2001

(54) SYSTEM FOR ANALYZING TELEVISION PROGRAMS

(75) Inventors: Richard A. Hullinger, Pittsburgh; William J. Trosky, Murrysville; Alan F. Mandel, Pittsburgh, all of PA (US); Robert Ross, Medford, NJ (US); John D. Bartels; Brian A. Schultz, both of Pittsburgh, PA (US)

(73) Assignee: CBS Corporation, Pittsburgh, PA (US)

( * ) Notice: Subject to any disclaimer, the term of this patent is extended or adjusted under 35 U.S.C. 154(b) by 0 days.

(21) Appl. No.: 09/134,667

(22) Filed: Jul. 30, 1998

(51) Int. Cl.[7] .............................. H04N 7/08; H04N 5/445
(52) U.S. Cl. .................... 348/468; 348/461; 348/465; 348/473; 348/906; 725/9; 725/20; 725/40; 725/45; 725/46; 345/327
(58) Field of Search .................... 348/465, 468, 348/460, 461, 473, 478, 906, 907; 725/2, 14, 18, 22, 20, 32, 37, 40, 43, 45, 46, 55; 345/327, 440, 140; 704/3, 8, 10; 707/531, 532, 536; H04N 7/08, 7/087, 5/445

(56) References Cited

U.S. PATENT DOCUMENTS

| | | | |
|---|---|---|---|
| 4,550,407 | 10/1985 | Couasnon et al. | |
| 4,677,466 * | 6/1987 | Lert, Jr. et al. | 725/22 |
| 4,773,009 * | 9/1988 | Kucera et al. | 707/531 |
| 4,857,999 | 8/1989 | Welsh . | |
| 5,231,493 * | 7/1993 | Apitz | 358/146 |
| 5,371,673 | 12/1994 | Fan . | |
| 5,398,304 | 3/1995 | Bauman et al. | 395/53 |
| 5,402,524 | 3/1995 | Bauman et al. | 395/50 |
| 5,402,526 | 3/1995 | Bauman et al. | 395/53 |
| 5,412,756 | 5/1995 | Bauman et al. | 395/50 |
| 5,564,088 * | 10/1996 | Saitoh | 348/906 |
| 5,585,865 * | 12/1996 | Amano et al. | 348/731 |
| 5,614,940 * | 3/1997 | Cobbley et al. | 348/7 |
| 5,758,259 * | 5/1998 | Lawler | 455/5.1 |
| 5,828,402 * | 10/1998 | Collings | 348/460 |
| 5,905,713 * | 5/1999 | Anderson et al. | 348/906 |
| 5,991,713 * | 11/1999 | Unger et al. | 704/9 |
| 5,999,193 * | 12/1999 | Conley, Jr. et al. | 345/440 |
| 6,008,803 * | 12/1999 | Rowe et al. | 345/327 |
| 6,020,883 * | 2/2000 | Herz et al. | 345/327 |
| 6,061,056 * | 5/2000 | Menard et al. | 34/327 |

FOREIGN PATENT DOCUMENTS 2 258 065A  1/1993  (GB) .

* cited by examiner

Primary Examiner—Reinhard J. Eisenzopf
Assistant Examiner—Jean W. Désir
(74) Attorney, Agent, or Firm—Eckert Seamans Cherin & Mellott, LLC

(57) ABSTRACT

A system that automatically captures one or more local news program broadcasts and separates the broadcasts into the individual news stories or segments. The system then compares the stories to historical data concerning the competitive characteristics of the stories for each station and determines the topic (local, national, crime, etc.), talent (newscaster 1, newscaster 2, etc.) and production (live, studio, voice-over-tape, etc.) characteristics of the stories. Other characteristics that affect the popularity and therefor the competitive characteristics of the broadcasts can also be displayed, such as pacing, average story length, news-to-advertisement ratio, broadcast ordering (news then weather then news then sports, etc.), etc. The characteristics are displayed in a visual format, such as a graph, with other historical data, such as show ratings that can be divided into increments such as ¼ hour, and optionally with the actual video/audio broadcast allowing assessment of competitors local news broadcasts.

33 Claims, 12 Drawing Sheets

SYSTEM FOR ANALYZING TELEVISION PROGRAMS

BACKGROUND OF THE INVENTION

1. Reference To Microfiche Appendix

A microfiche appendix having 1 microfiche and 29 frames is included herewith.

2. Field of the Invention

The present invention is directed to a system for analyzing television programs particularly local news programs and, more particularly, is directed to a system that captures a local news program broadcast, separates the broadcast into the individual news stories, determines the competitive characteristics of the stories which can include the topic, talent and production characteristics of the stories, combines the analysis results with historical data, such as show ratings, and provides the combined analysis along with the broadcast to a user allowing assessment of competitors local news broadcasts.

3. Description of the Related Art

In todays competitive television environment where local television stations can derive a significant portion of their income from the sale of advertisements during half-hour news programs that are broadcast throughout the day, a small ratings increase can translate into the ability to significantly raise advertising rates for advertisements during these local news broadcasts. In the past, station managers and news program directors have had to rely on broadcast ratings (such as Nielsen ratings) and their own subjective experience in viewing competitors broadcasts to evaluate what aspects of the broadcasts contribute to improved ratings. What is needed is an objective analysis tool that quantifies the competitive characteristics about a broadcast allowing news directors to analytically determine what contributes to improved ratings.

Further, in todays environment keeping the attention of viewers is difficult. As a result, the factors that contribute to improved ratings will change over time. What is needed is a system that will allow rapid analysis of a competitors broadcasts.

SUMMARY OF THE INVENTION

It is an object of the present invention to provide a system that objectively determines the competitive characteristics of news broadcasts.

It is a further object of the present invention to provide a station manager with improved competitive intelligence.

It is another object of the present invention to provide a news director with information about competing news broadcasts that has not previously been available.

It is also an object of the present invention to provide a system that helps a news director to optimize newscast ratings with respect to competitors.

It is a further object of the invention to provide a system that allows determination of the topic, talent and production characteristics of a broadcast.

It is an object of the present invention to provide a system that allows determination of how the topic, talent and production affect ratings.

It is another object of the present invention to digitize television broadcasts to allow display of the video on a computer with the competitive analysis data.

It is another object of the present invention to provide the ability to compare or correlate story content and/or competitive characteristics with ratings data.

It is a further object of the present invention to provide a system that allows monitoring of competition on a relatively real time basis.

It is a further object of the present invention to provide instant access to the video and audio content of specific news stories.

The above objects can be attained by a system that captures a local news program broadcast, separates the broadcast into the individual news stories, and determines the topic, talent and production characteristics of the stories by comparing the text of the broadcast with statistical information accumulated about prior broadcasts. The characteristics are combined with other historical data, such as show ratings. The system provides the combined analysis along with the broadcast itself to a user through a graphical user interface allowing an objective assessment of competitors local news broadcasts.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The present invention is directed to a system that analyzes television program broadcasts, particularly newscasts, and determines the correlations between content of the news (what was presented, who presented and how it was presented) and the ratings for the broadcast. This information, along with the broadcasts themselves, can then be used to optimize future newscasts to increase ratings. A television program broadcast can include one or more television programs and can be transmitted over a broad variety of media including a traditional airwaves broadcast, a cable broadcast, and a digital broadcast over a network, such as the Internet or any other medium suitable for distributing television type programs. A broadcast can also be initiated by the broadcaster or by the consumer when a computer user, through a web browser, requests the download of a television program. A television program can include newscasts and other types of television programs as well as other types of video/audio material suitable for viewing by a user.

Figure 1:
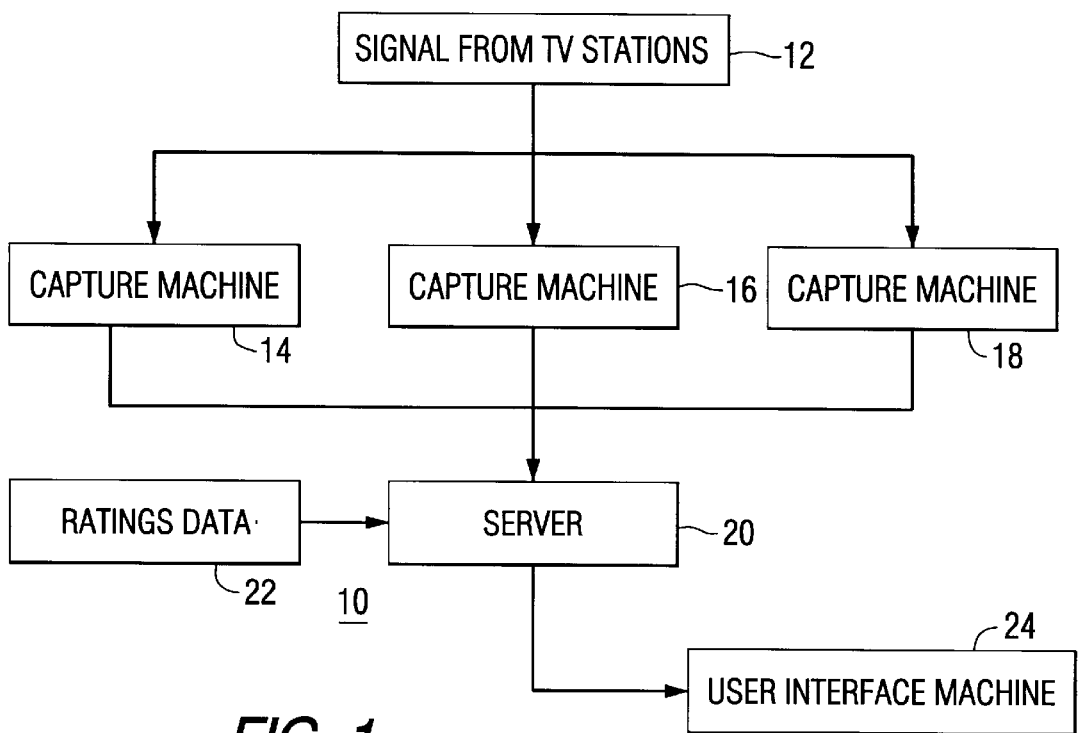
FIG. 1 depicts the hardware of the present invention.

The system 10, as depicted in FIG. 1, receives one or more television signals 12 from one or more local television stations. The reception can be via air waves, cable, digital network, magnetic media and any other media suitable for inputting video/audio material into the system 10. In the Pittsburgh market the local stations are KDKA, WTAE and WPXI. The signals are routed to one or more capture machines 14, 16 and 18, preferably, with a capture machine corresponding to each of the signals to be processed. However, it is possible to have a single machine performing the task of several capture machines although such is not preferred. These capture machines 14, 16 and 18 capture the video and audio of the broadcast as well as the closed-caption (CC) text broadcast with the program. The machines 14, 16 and 18 break the news broadcast into stories (or segments) and classify each story by the dominant topic, such as weather or sports, by talent, such as the person presenting the story, and by production, such as studio or live. Stories generally have the same characteristics (topic, talent and production) and where one of these characteristics changes the story generally changes. For example, a first video segment may be a local segment, by newscaster #1, and live. If the second segment is also a local segment, by newscaster #1, but the production type is studio, then a new story has started with segment 2. However, if the topic, talent and production types are the same for both segments, then they will be considered parts of the same story.

Each of the capture machines 14, 16 and 18 preferably is based on an IBM compatible personal computer (PC) with an Intel 300 MHZ processor with MMX, 64 Mb of memory, a 3+ Gb hard drive, a 14 inch VGA monitor, a Sound Blaster AWE 32 Soundcard available from Creative Labs, Creative SBS-300 Speakers also available from Creative Labs, a Single-Channel Closed Caption Capture Board which includes a TV tuner and is available from Postech, an Intel ISVR III Video Capture Board, a PCI 10/100 Twisted Pair Ethernet Card and a conventional mouse, keyboard and CD-ROM drive. The system preferably uses the Windows 95/98 operating system. The capture machines 14, 16 and 18 could alternatively include the hardware necessary to capture the video and compress it into an MPEG-1 video stream.

The broadcast data generated from the analysis is transferred to a server 20 which also receives ratings and share data 22 from a conventional source such as Nielsen overnight reports. The server 20 is preferably an IBM Compatible PC having an Intel 400 MHZ processor with MMX, 128 Mb of memory, a 4 Gb Hard Drive for application software and database, 9+ Gb of Storage for each station to be monitored, a 14 inch VGA Monitor, a PCI 10/100 Twisted Pair Ethernet Card and a conventional mouse, keyboard and CD-ROM drive. The system 20 preferably uses the Windows NT operating system.

The broadcast and segment data, the video and audio data, and the ratings data stored on the server 20 are made available to a news program manager through one or more user interface machines 24. The user can play the video and audio, and review the data in the form of charts, etc. Each user interface machine 24 is preferably an IBM Compatible PC having an Intel 300 MHZ processor with MMX, a 64 Mb of memory, a 3+ GB hard drive, a 21 inch SVGA Monitor, a Sound Blaster AWE 32 Soundcard, Creative SBS-300 Speakers, a PCI 10/100 Twisted Pair Ethernet Card and a conventional mouse, keyboard and CD-ROM drive. The system 24 preferably uses the Windows NT operating system.

If processing needs to be faster, a special processing machine (not shown) can be positioned between the capture machines 14, 16 and 18 and the server 20. This processing machine would perform the analysis discussed herein while the capture machines 14, 16 and 18 would be dedicated to the capture process. This machine could be based on DEC AlphaStation 500 MHZ RISC Processor, with 256+ Mb of memory, a 4+ Gb hard drive, a 14 inch VGA Monitor, a 10/100 Twisted Pair Ethernet Card and a conventional mouse, keyboard and CD-ROM drive. This additional system preferably would use the DEC UNIX operating system. Of course, as previously mentioned the entire system could be implemented in a single system 10 based on a midsized computer such as an ALPHA machine made by Digital Equipment Corporation.

Figure 2:
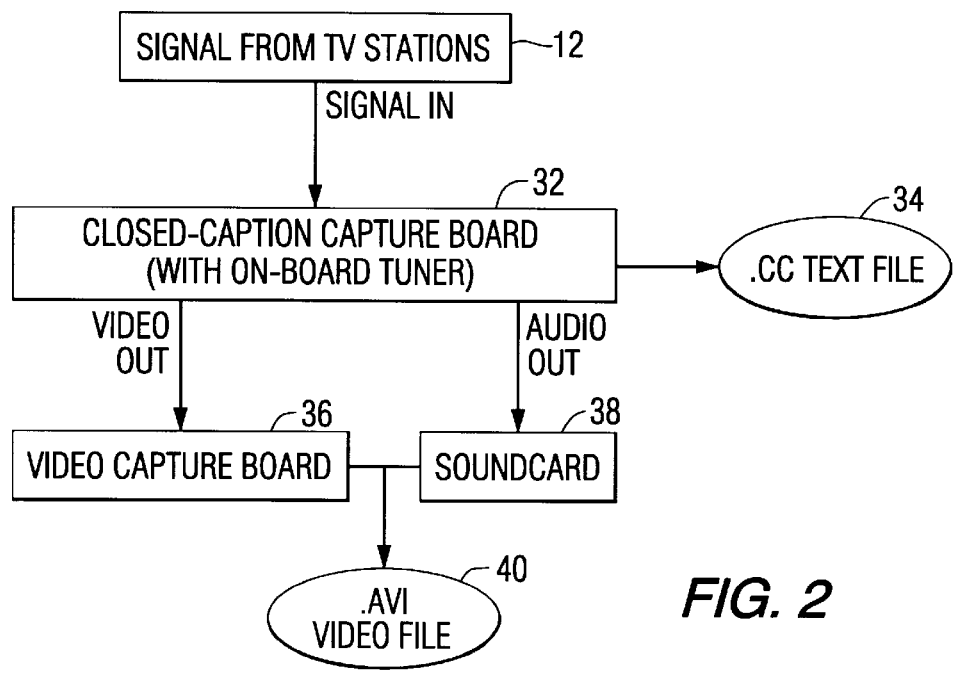
FIG. 2 illustrates data flow of the capture process within each capture machine of FIG. 2.

FIG. 2 illustrates the signal and data flow that occurs within each of the capture machines 14, 16 and 18. The signals 12 from the television broadcasts are supplied to the closed-caption capture board or unit 32 previously mentioned. This board 32 outputs a closed-captioned text file 34, the use of which will be discussed in more detail later, and separately outputs the video signal to the video capture board or unit 36 previously mentioned and the audio signal to the sound board or unit 38 previously mentioned. These two boards together produce a video file 40

Figure 3:
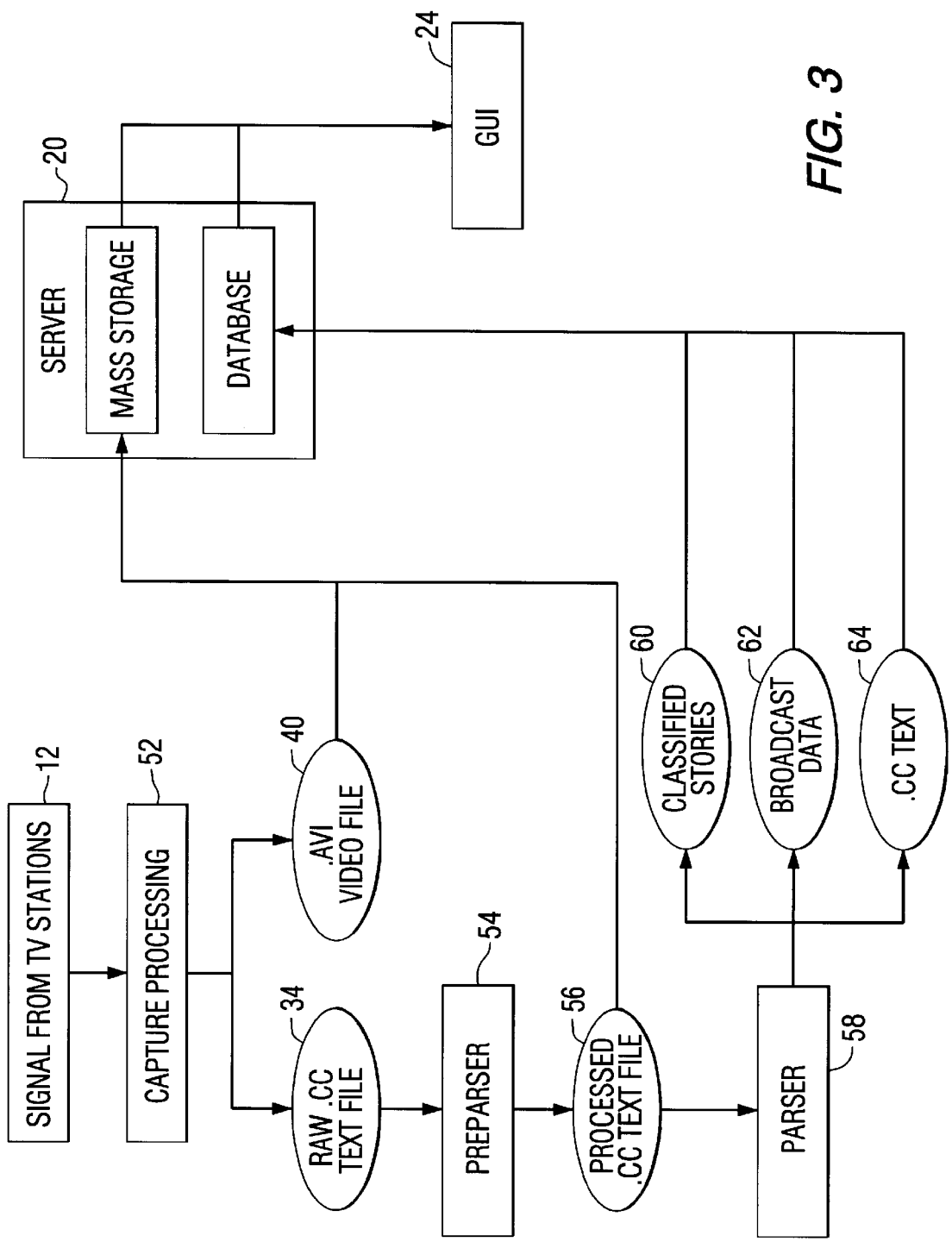
FIG. 3 is a block diagram of the operations performed in the present invention.

As depicted in FIG. 3, the invention includes several stages of processing. The first stage is capture processing 52 which results in the files 34 and 40 previously mentioned. The capture process 52, which will be discussed in more detail later, essentially starts the capture of the video signal at the proper time, creates the appropriate files 34 and 40, and then starts the preparser 54. Additional details concerning the preferred file naming conventions can be found in the Appendix hereto under File Naming Conventions. The closed-captioned raw data file 34 is supplied to the preparser process 54 which will be discussed in more detail later, essentially removes meaningless characters from the closed-captioned text and adds information such as broadcasts slot and related file identifiers. This creates a processed closed-captioned text file 56 which is supplied to a parser process 58 and stored in the server 20. The parser process 56, which is typically executed immediately after the preparsing process 54 and which will be discussed in more detail later, essentially reviews the closed-caption text 56, divides the broadcast into stories or segments, and determines the topic, talent and production values for each segment. This information along with the closed-caption (CC) text is stored in database tables and associated files 60, 62 and 64 in the server 20. The user at the user interface machine 24 can access and display the data stored in the server 20 (classification, ratings, pacing, average story length, etc.) along with playing the video/audio to see what components of the broadcast affect the ratings for a broadcast.

Figure 4:
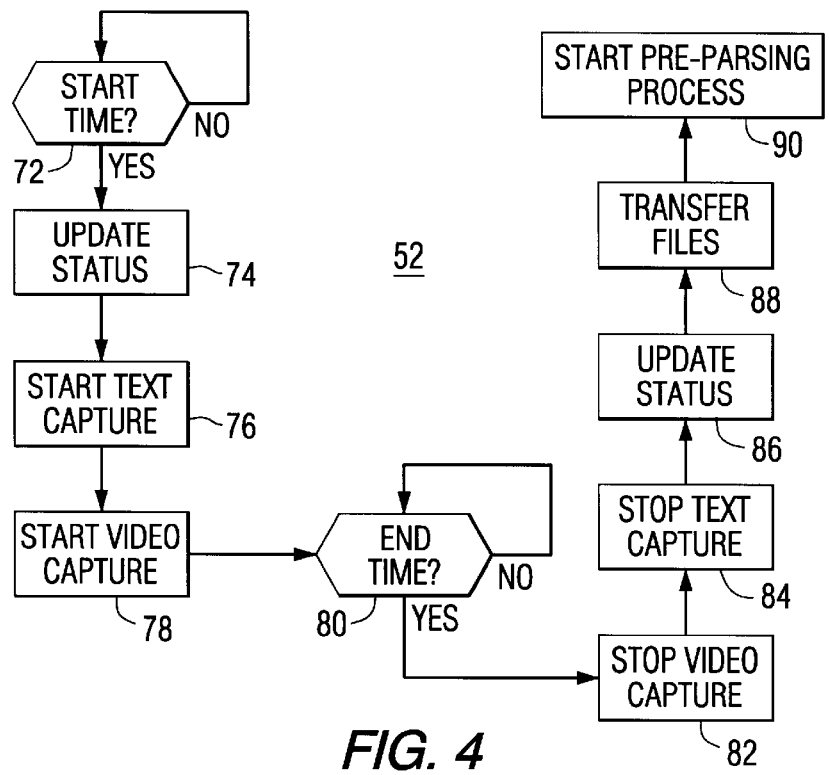
FIG. 4 depicts the operations of the capture process 52.

The capture process 52, as depicted in FIG. 4, once the hardware boards 32, 36 and 38 have been initialized, waits 72 for the start time which coincides with the beginning of a target news broadcast. Once the start time has been reached, the status of the system is updated 74 to "capturing" status, so that a user will be informed that capture has started, if an inquiry is made. Next, the text capture is started 76 by board 32 followed by the start 78 of the video/audio capture by boards 36 and 38 at a desired capture video frame rate and resolution, such as 5 frames/second at 160×120. When the end of the broadcast time has been reached, the text and video/audio capture is stopped 82/84 and the status is updated 86 to "idle." The files, with appropriate information concerning the channel, time of capture, etc (see naming conventions discussion) are then transferred 88 and the pre-parsing process is then started 90. Additional details of the capture process 52 can be found in the pseudo-code of the Appendix entitled Capture Control Program Flow and Pseudo-Code.

Figure 5:
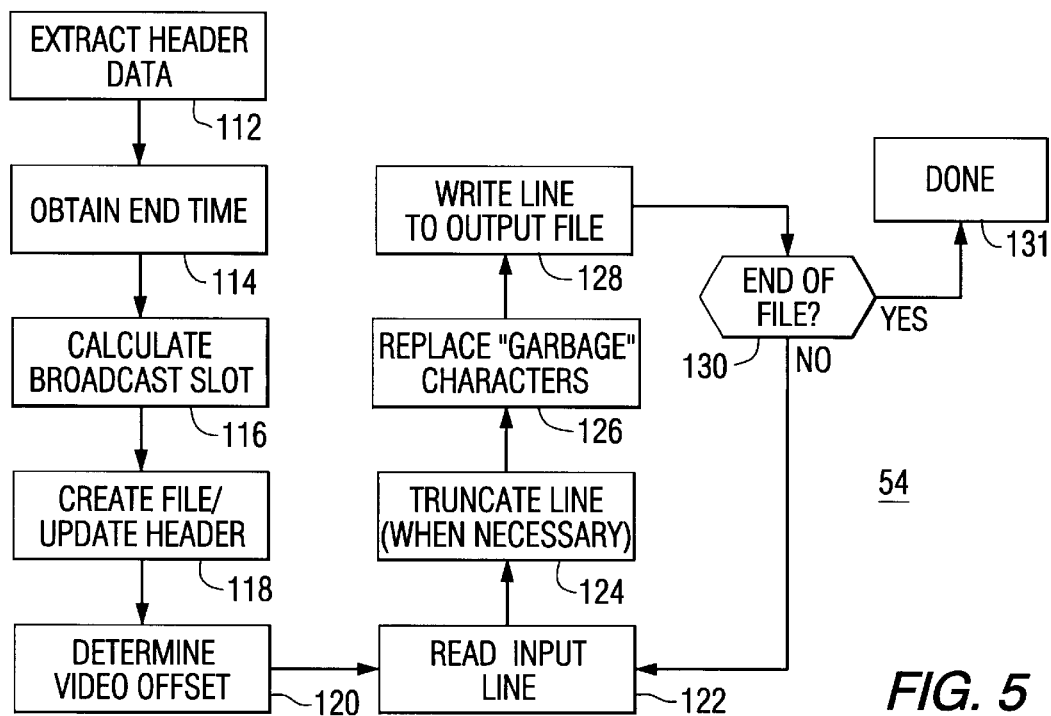
FIG. 5 depicts the operations of the preparser process 54.

The preparser process 54, as depicted in FIG. 5, starts with the raw closed-caption data file 34, which has a format as set forth in the Appendix entitled Raw Data File, and essentially converts human friendly data into machine friendly data. The header of the file 34 is used to obtain 112 the date and time of capture as well as the station number. The last record in the file 34 is read to obtain the ending time of the text capture. Next, the broadcast slot ID of the broadcast is determined by accessing the (relational) database which shows the links between broadcast start and end times and broadcast slot ID's. In the example of the Appendix the slot is "3". A new file 56 (the processed or preprocessed data file) is then created 118 and the header is updated with the ID as well as the date and frame rate of the capture. In the example of the Appendix the frame rate is "5". The offset in frames from the start of the video capture to the start of the text capture is determined 120. This allows the text to be correlated to the exact frame(s) in which it is produced. The offset is determined by obtaining a difference (which can be negative) between the time of the first line of text data and the video capture start time. This difference is multiplied by the frame rate. This value is stored in the header of the new file 56. Next, a line of text is read 122 and the line of the text is truncated 124 if it is longer that a predetermined length, such as 80 characters. In the example of the Appendix this occurs in the line [17:56:31 ]. Each of the characters in a text line is also examined to determine if it is a valid character (not valid unless the ASCII value is 32–122) and if not the character is replaced 126 with a space. In the example of the Appendix the characters "@," "&" and "~" are replaced with blanks. Then the text is written 128 to the output file 56 with the appropriate time stamps. A determination 130 is then made as to whether the end of the data has been reached. If not, the process continues, and if so, the process is finished 131. An example of the preprocessed text file is shown in the Appendix as Preprocessed Data File. Additional information about the preparser process 54 can be obtained from the pseudo-code of the Appendix entitled Preparser Program Flow and Pseudo-Code.

The parser process 58 uses two types of tables: a vocabulary table and a score table. The contents and structure of these tables will be discussed before the parser process 58 is discussed. How these tables are created will be discussed later herein.

There are essentially at least three vocabulary tables, one for each length of phrase that will be examined during the parsing. That is, a one-word vocabulary table holds phrases of one word (see the example below), a two-word vocabulary table holds phrases of two words and a three-word vocabulary table holds phrases of three words. The phrases are stored in alphabetical order for fast searching, and each phrase entry contains three pieces of data: 1) The text of the phrase; 2) a unique phrase ID, which is used to look up the phrase in the designated score tables; and 3) an array of score table identifiers (IDs) indicating which score tables/files contain the phrase. These table IDs are references to actual files (names), so when the parsing process 58 is looking up the score data for a phrase, the process 58 knows which files contain the phrase, and can limit a search to the designated files.

Example One-Word Vocabulary Table

| Phrase | Phrase ID | Score1 TableId | Score2 TableId | Scored TableId |
|---|---|---|---|---|
| Crime | 28 | 1 | 2 | 5 |
| Crimes | 29 | 2 | 3 | 12 |
| Criminal | 30 | 1 | 2 | 8 |

In the above example, the word "crimes" has a Phrase ID of 29 and can be found in score tables 2, 3 and 12.

There are N score tables where N is the number nodes in the scoring table tree. The tree will be discussed in more detail with respect to FIG. 6. Each table (see the example below) contains a list of phrases, their occurrence frequency and scoring data. The phrases are stored in ascending numerical order by PhraseID for fast searching. Each entry contains the following pieces of data: 1) The PhraseID that refers back to the actual text in a vocabulary table. 2) The total count which is the total number of times that this particular phrase has been seen in closed-caption (CC) text before. 3) The topic counts, which are then the number of times that this phrase has been seen in the CC text that was about the given topic (Topic1, Topic2, . . . ). 4) The talent counts which are the number of times that this phrase has been seen in CC Text that was presented by the given talent (Talent1, Talent2, . . . ). 5) The production counts which are the number of times that this phrase has been seen in CC Text that was presented with the given production type (Production1, Production2, . . . ) A typical set of topics could include: local, national, international, sports, weather, advertisement, tease, other and unknown. A typical set of production values could include: live, tape, studio, other and unknown. The set of talent (that is, the people involved in the broadcasts) is dependant on the market being monitored, and will even change within that market as reporters start, quit and change stations.

TABLE I

| Phrase ID | Total Count | Topic 1 | Topic 2 | ... | Topic N | Talent 1 | Talent 2 | ... | Talent N | Production 1 | Production 2 | ... | Production N |
|---|---|---|---|---|---|---|---|---|---|---|---|---|---|
| 28 | 194 | 81 | 23 | ... | 17 | 44 | 21 | ... | 19 | 130 | 52 | ... | 5 |
| 29 | 17 | 5 | 8 | ... | 0 | 15 | 2 | ... | 0 | 12 | 4 | ... | 0 |
| 30 | 241 | 7 | 203 | ... | 28 | 77 | 23 | ... | 14 | 120 | 79 | ... | 6 |
| 31 | 100 | 18 | 41 | ... | 22 | 19 | 51 | ... | 2 | 0 | 38 | ... | 12 |

In the above table I for phrase 29 ("Crimes") the total count is 17, the topics 1, 2 . . . n have scores of 5, 8 and 0 respectively, talents 1, 2 . . . n have scores 15, 2 and 0 respectively and production values 1, 2 . . . n have scores of 12, 4 and 0 respectively.

A constraint, which follows from the way in which the score table is generated (to be discussed later herein), is preferably placed on the entries in the score table. The sum of the topic counts equals the sum of the talent counts, which equals the sum of the production counts, which equals the total count. That is to say that every time a phrase is seen in CC text, it is recorded in the appropriate score table(s), the total count is incremented, and one and only of one of the topic counts, talent counts and production counts is incremented.

As a more concrete example, if a particular news program manager or news director was only interested in recording four topics (Local, National, Weather and Other), only had 3 Talents (Sam D., Dan R. and P. Jennings), and only cared about three production types (Live, Studio and Other), one of the score tables might look something like below.

TABLE II

| Phrase ID | Total Count | Local | National | Weather | Other | Sam D. | Dan R. | P. Jennings | Live | Studio | Other |
|---|---|---|---|---|---|---|---|---|---|---|---|
| 28 | 100 | 70 | 25 | 2 | 3 | 35 | 35 | 30 | 28 | 72 | 0 |
| 29 | 9 | 9 | 0 | 0 | 0 | 5 | 1 | 3 | 8 | 0 | 1 |
| 30 | 25 | 1 | 12 | 12 | 0 | 10 | 8 | 7 | 5 | 9 | 11 |

Figure 6:
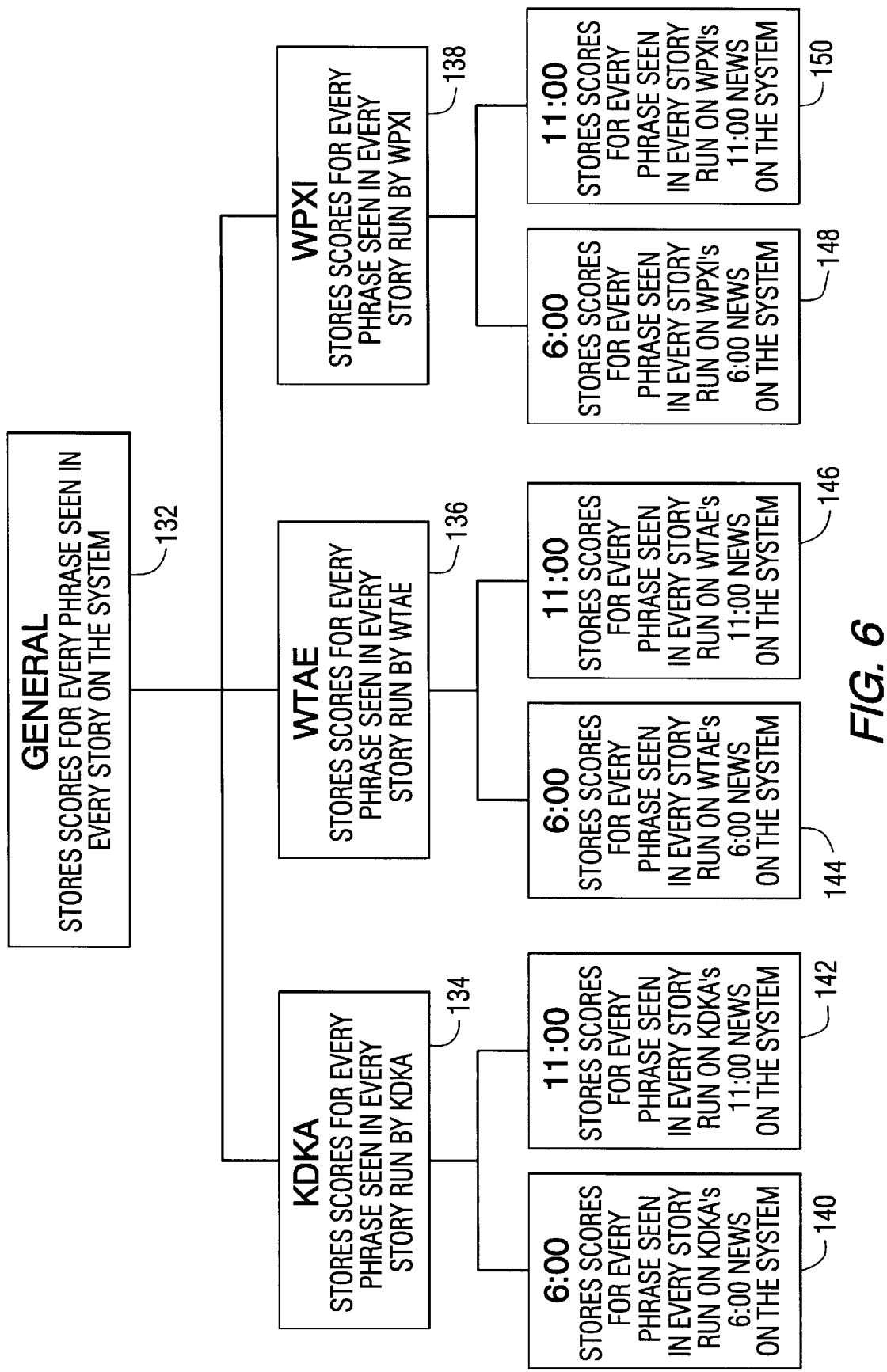
FIG. 6 is an example of a score tree.

As previously mentioned there are N score tables. The number N can be determined using a score table tree such as illustrated in FIG. 6 which depicts ten score tables. Each node of the score table tree represents a score table/file that contains scoring data derived from a specific subset of all of the closed-caption text previously processed by the system. When the present invention is implemented at a new location, the tree would be typically set up with three levels. The top level node 132 is the general score file/table and holds scores for every phrase encountered in all the news stories included in the system. The second level nodes 134, 136 and 138 hold the station score files/tables, one file for each station that the system is recording. For example, the score table for node 134 holds all the phrases for every news story run by station KDKA included in the system. The third level nodes 140, 142, 144, 146, 148 and 150 hold a scores for all phrases the system has recorded. The tree of FIG. 6 is just an example and new or additional nodes with more specific definitions could be added to the tree below the current leaf nodes at any time. For example, it is possible to add another level to the tree below the broadcast slot level that contained two nodes below each broadcast slot node: one with scores for phrases heard in the first 15 minutes of the broadcast, and the other with phrases heard in the last 15 minutes of the broadcast.

Figure 7:
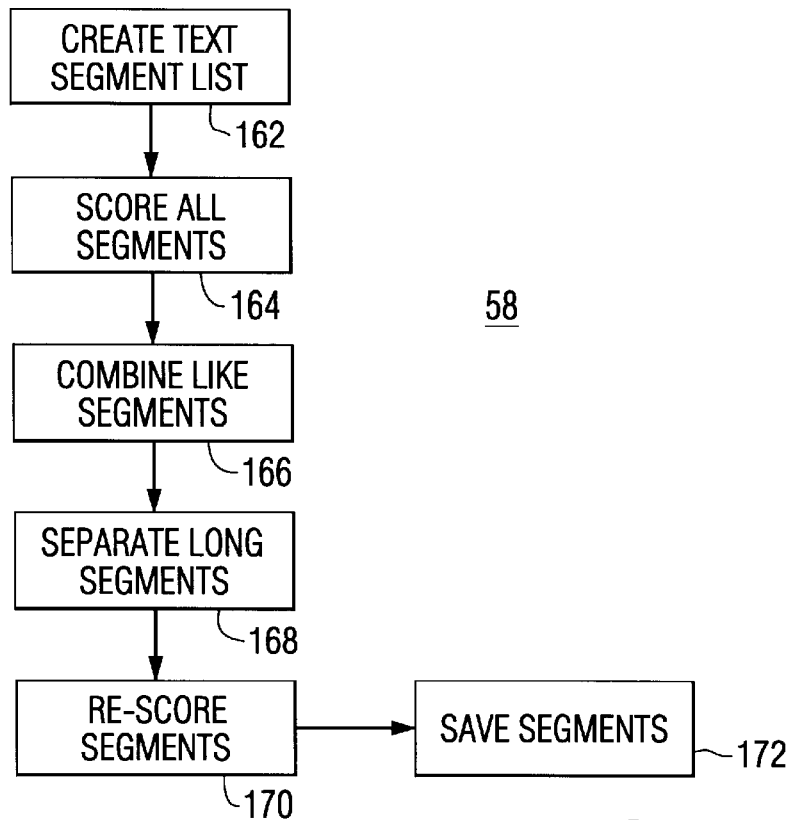
FIG. 7 depicts the operations of the parser process 58.

The parser process 58, as depicted in FIG. 7, starts by creating 162 a text segment list where each segment corresponds to a line of text in the closed-caption (CC) text file 56. With each line of text being an individual segment the process 58 essentially scores each segment and examines each segment to see if it can be combined with the segment directly in front of or behind it using the scores. If the segment can be combined because they have the same topic, talent and production, then they are combined. Once the segments are combined they are rescored because the score of the new segment can change due to the combination.

In determining whether segments should be combined or maintained as separate stories, the first step is to score 164 all the segments. This is accomplished by scoring the three-word phrases, the two word phrases and the one word phrases in the segment. Of course it is possible to limit the system to only one or two word phrases or to additionally allow four, five or more word phrases if desired. To do this the phrase is looked-up in the vocabulary table to obtain the phraseID and the score tables pointers for the phrase. The most detailed score tables are accessed based on the lowest table of the tree found in the score table list. For example, if the phrase appears in a broadcast slot table (say table 150 of FIG. 6) it is accessed, next a station table (such as table 138 in FIG. 6) is examined for the phrase and if not found the general score table (say 132 of FIG. 6) is used. The segment score for each of the topic, talent and production values found in the table is updated (accumulated).

Once two segments are scored they can be combined 166. If the topic, talent and production values for two segments match, they are combined into a single segment. The system also combines segments by looking at tease type segments between similar segments. If a segment is a tease segment it is combined with the segment in front of it or the segment behind it based on the similarity of the topic, talent and production values of the tease and the adjacent segments. The current segment is combined with the most similar segment. To separate segments 168 the system essentially looks for time gaps (a minimum of 30 seconds) in segments that are at least a minimum length in time (preferably 5 minutes) and do not have a segment topic classification of other. The combined and separated segments result in a revision of the segments list.

Once the segments are combined or separated, they are rescored 170. When phrases are scored, the system attempts to score the longest phrase possible under the assumption that longer phrases are more specific, and will provide more accurate scoring information. If, when scoring, the system scores all of the words and phrases in a segment up to, but not including the final word, then the system can only look up the scores for the final one-word phrase, because there's only one word left in the segment and scoring between segments is not performed.

When a segment is combined with the segment following it, that single word is no longer at the end of the segment, but somewhere in the middle, and it may now be part of a two or three word phrase. If this is the case, then two things change. 1) The new two or three word phrase must now be accounted for in the scoring, because it may have drastically different scores than the one-word phrase did. 2) Everything following the new phrase must be re-scored, because if the new phrase uses the first one or two words of the second segment, then the phrase matching for the rest of the segment will turn up different phrases and score differently. As an example, assume that the system is presented with the sentence "A Pittsburger walked to the Statue of Liberty to visit the President of France" which appears as two adjacent segments in the CC text. The two segments being: segment1="A Pittsburger walked to the Statue"; and segment 2="of Liberty to visit the President of France." Assume also that the phrases in the segments are scored as follows:

| Phrase | Local | National | International |
|---|---|---|---|
| A Pittsburger | 0.7 | 0.1 | 0.1 |
| walked to the | 0.3 | 0.0 | 0.0 |
| Statue | 0.2 | 0.2 | 0.2 |
| of | 0.0 | 0.0 | 0.0 |
| Liberty to visit | 0.7 | 0.2 | 0.1 |
| the President of | 0.1 | 0.7 | 0.2 |
| France | 0.1 | 0.3 | 0.6 |
| Statue of Liberty | 0.0 | 0.7 | 0.3 |
| to visit the | 0.0 | 0.0 | 0.0 |
| President of France | 0.0 | 0.0 | 1.0 |

With this phrase scoring segment1 has a score of Local=1.2, National=0.3 and International=0.3 while segment2 has a score of Local=0.9, National=1.2 and International=0.9. If segment1 and segment2 are combined simply by adding their scores and not re-scoring the new segment, the scores would be: Local=2.1, National=1.5 and International=1.2. Because the local topic has the highest score the new segment would be given a classification of "Local". However, if the segment is re-scored, we have:

New segment:
"A Pittsburger walked to the Statue of Liberty to visit the President of France"
New phrases:
A Pittsburger, walked to the, Statue of Liberty, to visit the, President of France Score:
Local: 1.0, National: 0.8, International: 1.4

The rescoring of the newly combined segment would result in the segment being classified as "International". This same score changing may occur when the segments are broken apart, so segments must be re-scored every time they are combined or split-up.

Once the segments are rescored, and the segment list is updated and the stories and their classification data are stored in the segment table of the database. Also, the broadcast data is stored in the database's broadcasts table and the corresponding closed-captioned text is also stored in the CC text file 64. Additional information about the parsing process 58 can be found in the pseudo-code of Appendix entitled Parser Flow and Pseudo-Code.

Once the stories for one or more broadcasts have been classified and the ratings data for the broadcast has been updated, the user can access and display the data. However, before discussing the display of the data a description of how the vocabulary and score tables are created will be provided.

Figure 8:
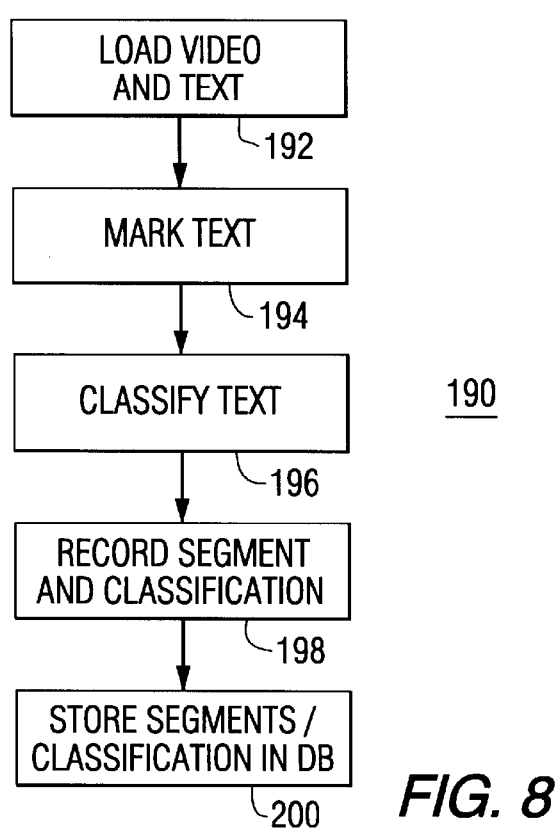
FIG. 8 shows the flow of a manual classification process.

To create the various tables the closed-captioned text of file 56 needs to be classified to create training data and this is performed by a manual classification process 190 illustrated in FIG. 8. This can be done immediately after the broadcast is captured if a real time type analysis is desired or at some later date. To perform the manual classification the system loads 192 the video/audio file 40 into a single video player, which will be discussed in more detail later herein, and loads the CC text file 56 into a CC text viewer. The video is played and viewed by an individual, called a classifier for convenience, who will perform a manual classification of the text. The classifier determines the starting and ending points of a story or segment in the text by viewing and essentially marking 194 the text using a conventional blocking method much like the blocking method used to mark (or highlight) text to be copied/cut in a word processor operation. The classifier then enters 196 the appropriate classifications for the segment by indicating the topic, talent and production for the segment. The system then records 198 this text as a story segment along with the classification, and the starting and ending lines of the text. The classification is then recorded 200 for each segment and the segment and associated classification is stored 202. A segment hold all of the information about topic, talent and production. Each line of cc-text stored and sequentially numbered, and the segment holds a topic, talent and production identifier, and a cc-text start ID and cc-text end ID for the segment. Every line of cc-text between the start line and the end line are a part of that segment, and therefore have the same topic, talent and production values. Additional information about the manual classification process 54 can be obtained from the pseudo-code of the Appendix entitled Manual Classifier Pseudo Code. Note that the classifier can be an automated, computer based classifier such as an expert system rather than a person.

Figure 9:
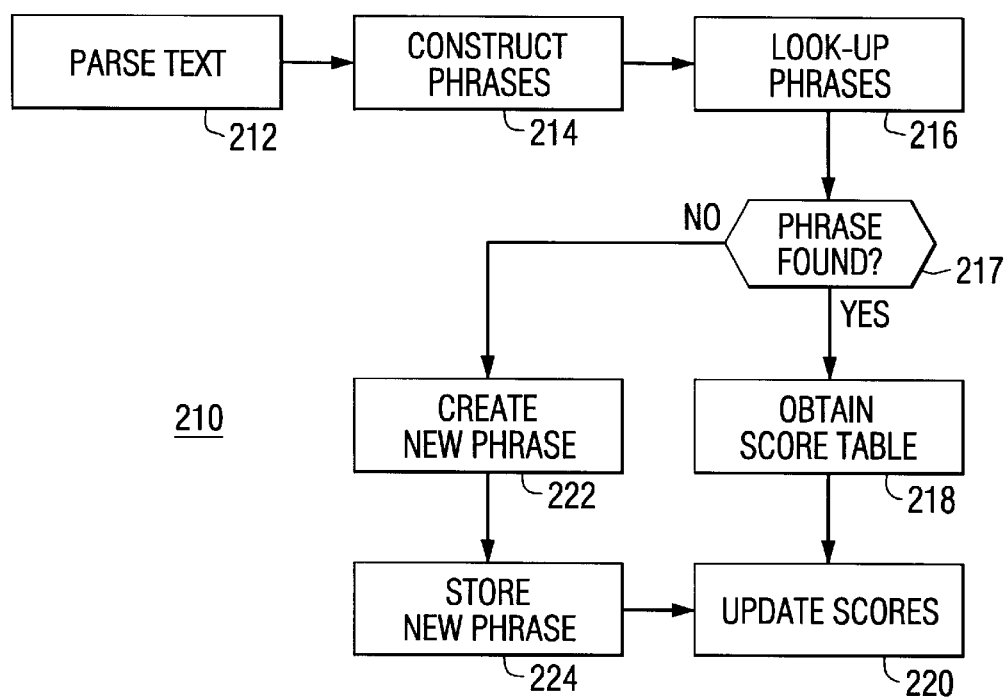
FIG. 9 is a flow diagram of a statistical process that determines values in score tables.

Once the story has been classified (the training data created) the vocabulary and score tables can be created. It is preferable that the stories for some period of time, such as a week, be accumulated before the tables are created or updated. However, the statistical process can be run after each broadcast is classified when an up-to-the-minute database is desired. The statistical information process 210, as illustrated in FIG. 9, starts with parsing 212 the text into all of the separate words. Then, all of the 1, 2 and 3 word phrases are constructed 214. For example, the text "the door is now closed" becomes the 12 phrases: the; door; is; now; closed; the door; door is; is now; now closed; the door is; door is now; is now closed.

Each phrase is then looked up 216 in the vocabulary table. If the phrase is determined 217 not to be in the vocabulary table, a new entry is made in the vocabulary table, a phraseID is assigned, a pointer to the appropriate score table is created and the scores/counts (total and appropriate topic, talent and production) of the score table for the slot of the broadcast is updated from the information for the text entered by the classifier. Note that the phrases in the vocabulary table are in alphabetical order so sorting and other housekeeping operations for the vocabulary table responsive to the new phrase may be required. Preferably, all of the new phrases would be accumulated in a new phrase file, at the end of the statistical process the files combined/merged and sorted into the preferred alphabetical order.

When the phrase is in the vocabulary table, the score table pointers are used to address 218 the appropriate score table for the slot of the broadcast and the scores in the table are updated 220. If the phrase is not in the table, a new phrase is created 222 and stored, and then the scores for the new phrase are updated. Additional information about the statistical process 210 can be obtained from the pseudo-code of the Appendix entitled Stats Package Pseudo Code.

Figure 10:
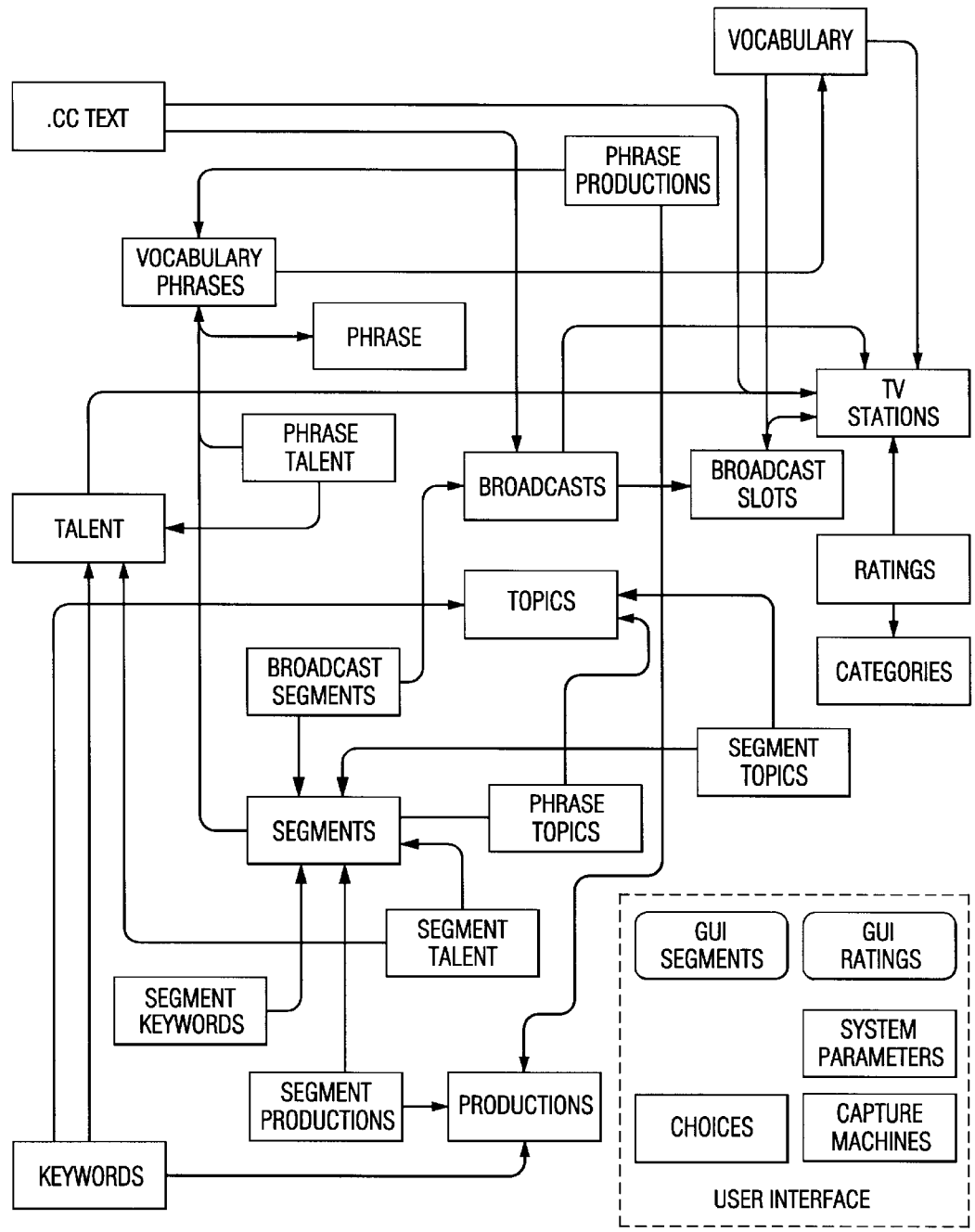
FIG. 10 depicts preferred structure of the database of the present invention.

The database of the present invention preferably has a structure as depicted in FIG. 10. This data structure, which is typically stored on a computer readable medium and facilitates the efficient execution of the process described herein includes a pointer directed set of tables which include the vocabulary tables and score tables previously discussed.

As previously mentioned, once the stories for one or more broadcasts have been classified and the ratings data for the broadcast has been updated, the user can access the data through the user interface device by playing the broadcasts individually or simultaneously using a specialized video player. The user can also simultaneously or separately display the text of the broadcast and the ratings data in the form of charts. The data charts will be discussed first followed by the video players.

Several different types of charts are provided by the present invention. The charts themselves are created and displayed via conventional chart creation techniques, such as found in the Olectra Chart package available from the K.L. Group and the interaction of the charts with other objects, such as the video players, etc. is discussed in more detail herein.

Figure 11:
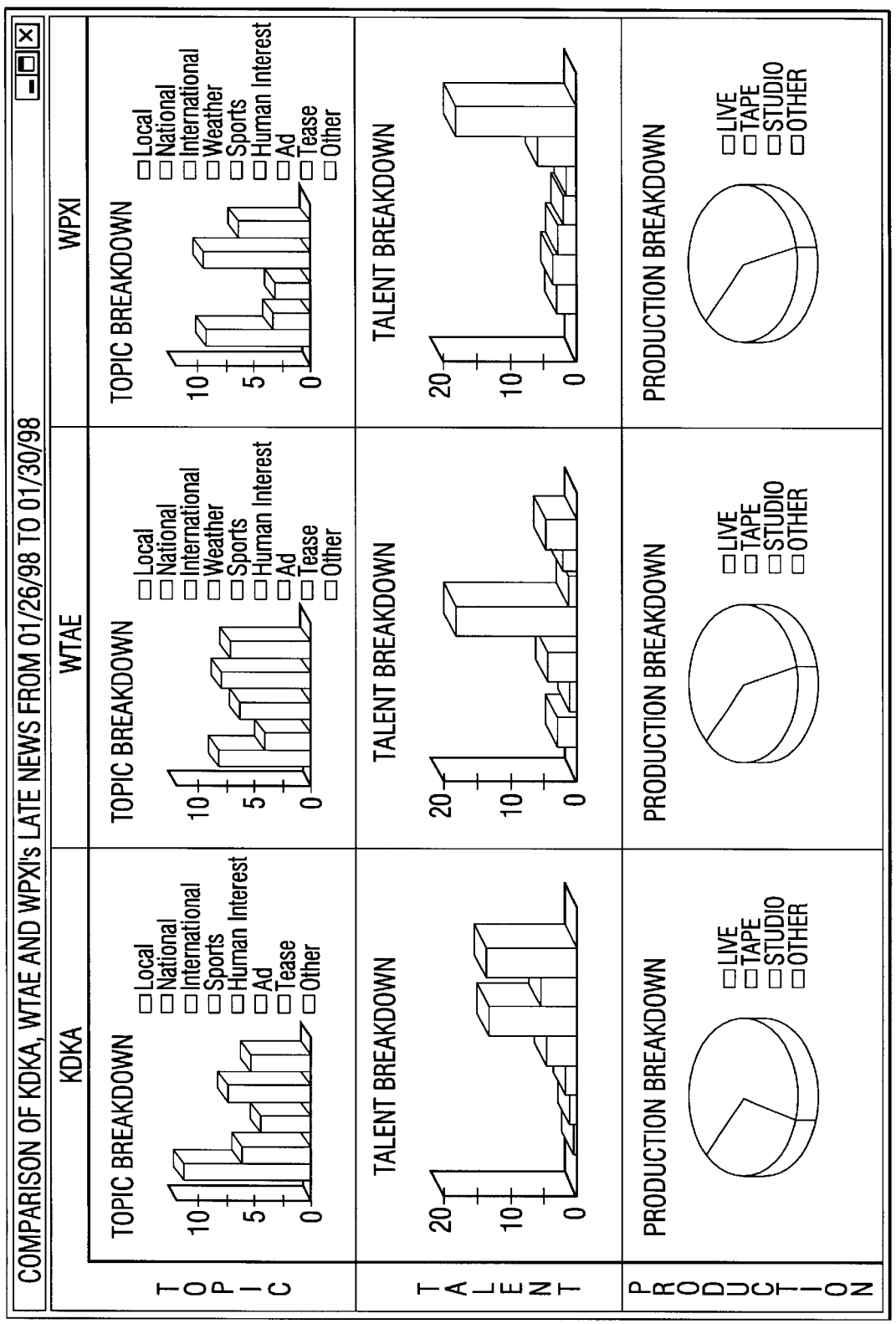
FIG. 11 illustrates types of classification charts.
Figure 12:
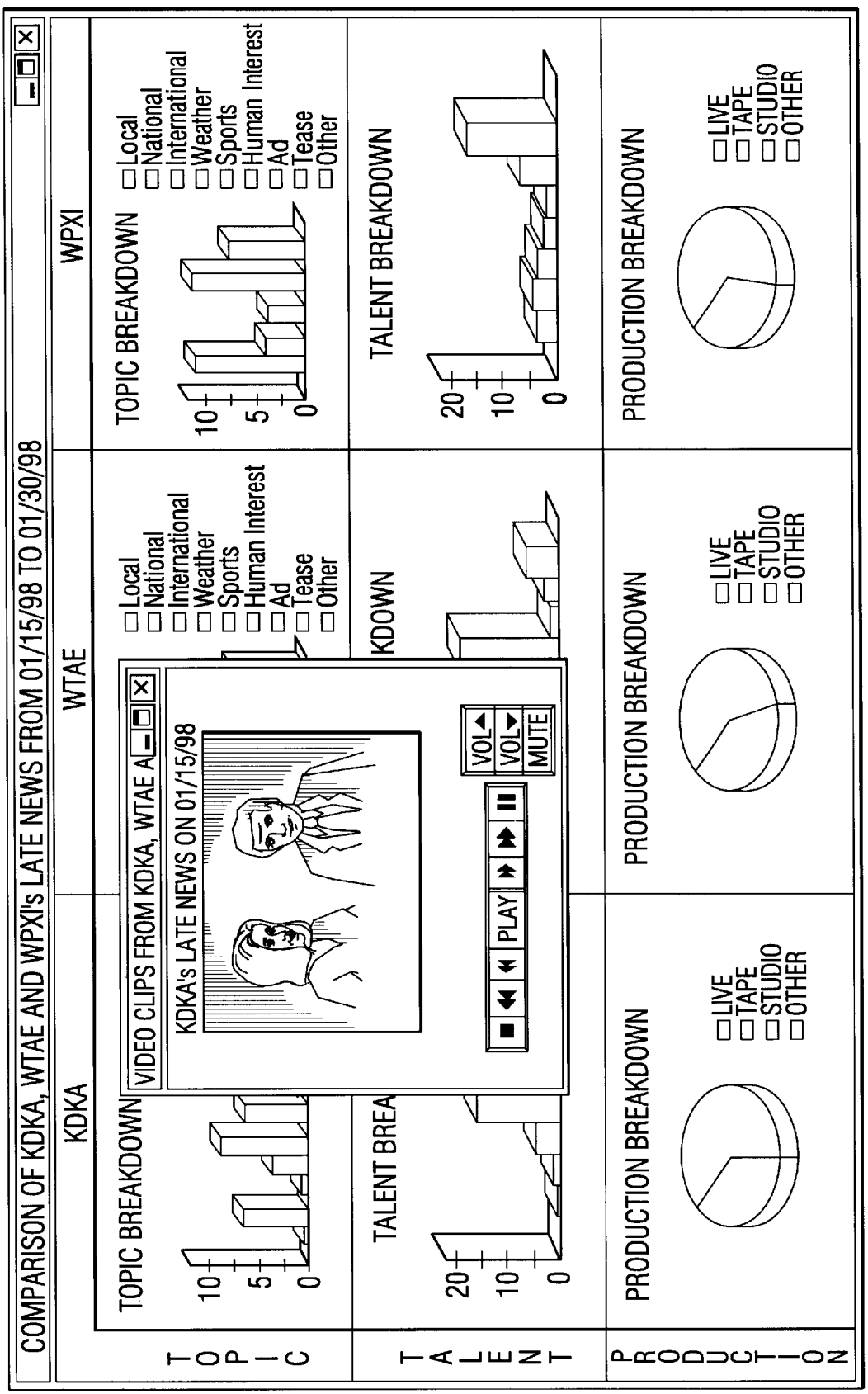
FIG. 12 illustrates charts with other types of interfaces being simultaneously displayed.

FIG. 11 illustrates the types of charts that are used to display the classification data for the stories of a particular broadcast slot while FIG. 12 shows charts with interfaces to other types of data. FIG. 11 provides a view that allows the user to compare the average topic, talent and production for two or more stations. When the user moves the cursor over a particular bar or pie wedge, then the chart displays a bubble label giving the user more information about the particular data object (in the example, the label shows that 4 minutes and 31 seconds of the broadcast was dedicated to the topic sports). Left clicking the mouse when the cursor is over a data object displays a context menu that allows the user to choose several ways to view the data of the object in more detail. Double clicking the mouse when the cursor is over a data object opens a video player so that the user can watch the individual stories that are represented by the data object. This will be discussed in more detail later.

Figure 13:
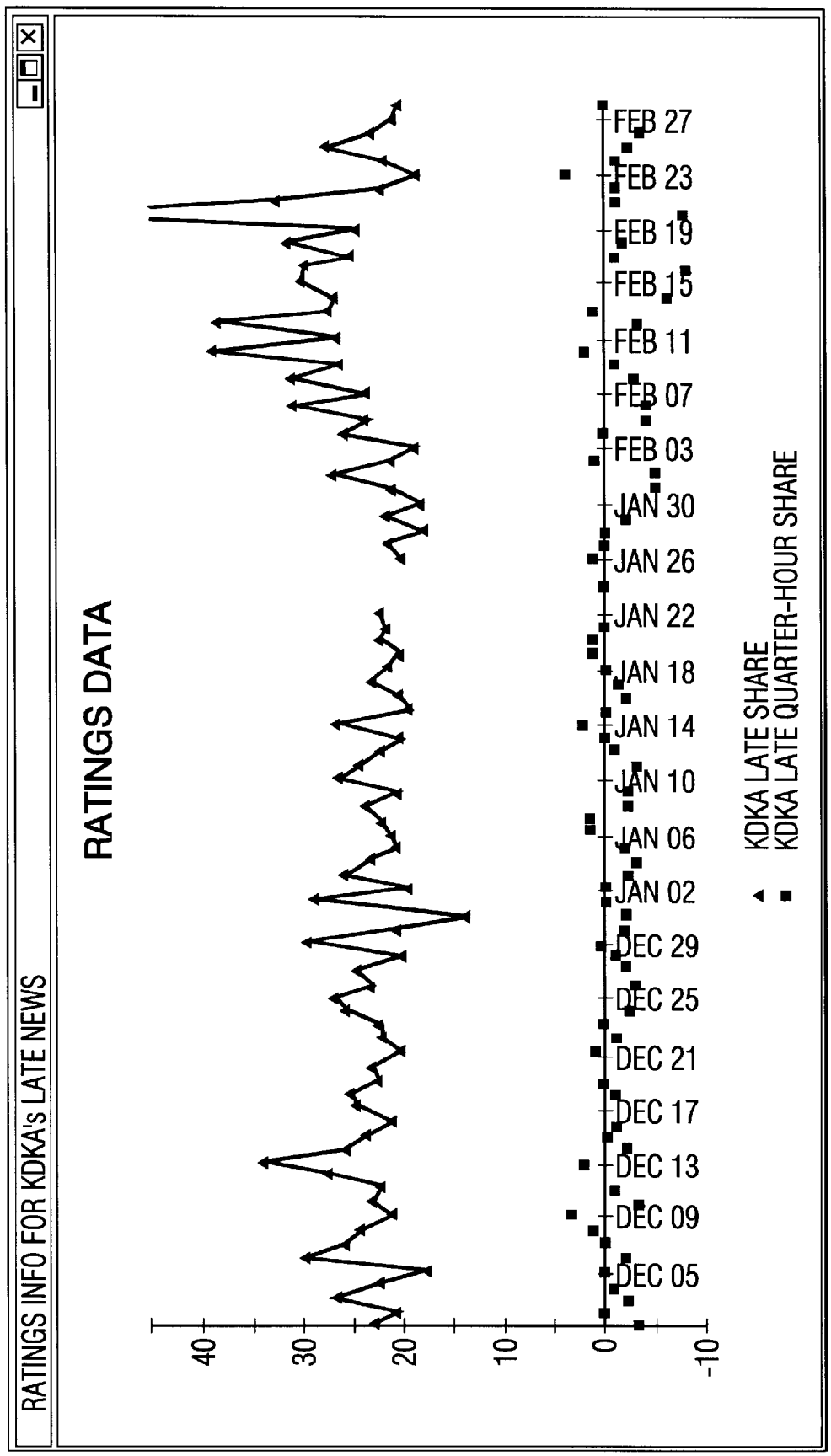
FIG. 13 illustrates a ratings charts.

FIG. 13 illustrates a rating charts. The ratings view of FIG. 13 allows the user to look at ratings and/or share data for the time period specified in the Start Time and End Time fields in the toolbar. The chart of FIG. 13 shows ratings share data, along with a linear-fit of the data to aid in analyzing ratings trends. When the user right-clicks on the background of any chart, the chart properties dialog is displayed (options in the dialog change slightly with chart type (bar and pie or ratings plot)). The ratings chart which may include the ability to look at any combination of ratings and share data, actual data or linear fit approximations, as well as control over placement and visibility of the title and key. Other options include the ability to view the half-hour average ratings data, the change in viewership across a 15 minute break or the change in viewership from the lead-in program. Similarly, the user can use the chart properties dialog to access axis customization tools. Here the user can establish the range of the X and Y axes, change the spacing between tick-marks on the axes, and turn grid lines in the X and Y direction on or off.

All of the charts and graphs in the system of the present invention, regardless of their style (bar chart, pie chart, plot . . .) or how they were created, are derived from a single chart object, so they all share the same set of attributes and interactions.

The following table describes the possible actions taken inside a chart and the associated reaction that the chart will exhibit. In the chart the term "data area" refers to any particular piece of data in the chart (a single bar, pie wedge, or plot point) and the term "background" refers to any part of the chart that is not a data area.

Any time the phrase "stories that make up the data" is used, it means that the application queries the database for a list of stories that fit the specified criteria. If the chart shows the topic breakdown for KDKA's evening news from 01/01/97 to 01/31/97 and the user double-clicks on the bar representing the national news, then "all the stores that make up that data" would be all of the stories that ran on KDKA's evening news from 01/01/97 to 01/01/31 that were labeled as national news. For a more detailed description of the process, see the pseudo-code in the Appendix.

| Action | Chart Reaction |
| --- | --- |
| Cursor moves over a data area in the chart | Cursor changes from an arrow to a magnifying glass, indicating that the user can get more information about the data. A "bubble label" is displayed giving the user information about the data: What the data represents (the same text that is displayed in the key) The data value Any previously displayed bubble label is removed. |
| Cursor moves off of data area in the chart | Any previously displayed bubble label is removed. |
| Mouse is left-clicked while the cursor is over the chart's background | A tabbed dialog box is displayed, allowing the user to update the chart's physical attributes (the title, the axis ranges. . .) . Once changes are made, and the dialog box is closed, then the chart is updated to reflect the new settings. If the chart is part of a series of similar charts from multiple stations (charts that show the same data for the other stations), then all the similar charts are updated to keep the views consistent. |
| Mouse is double-clicked while the cursor over a data area | A video player is launched, and the video clips for all the stories that make up the data area are loaded into the video player for viewing. |
| Mouse is left-clicked while the cursor is over a data area | A context menu is displayed showing four options: Video, Segment List, Detail Info, and Chart Properties. See below for descriptions of each choice. |
| Menu Option | Chart Reaction |
| Video | A video player is launched, and the video clips for all the stories that make up the data area are loaded into the video player for viewing. |
| Segment List | The segment list view is opened and populated with all the stories that make up the data. |
| Detail Info | A detail view is opened, showing the appropriate topic, talent and / or production charts for the stories that make up the data. Note: this option is grayed out when the context menu is displayed on charts in a detail view because further detail does not provide useful data. |

Chart Properties
  Same behavior as when the mouse is left-clicked when the cursor is over the chart's background.
Additional information about the charts process can be obtained from the pseudo-code of Appendix entitled Charts Pseudo Code.

A single video player is used to view a video(s) from a single television station. The creation of the video player and the conventional functions such as play, rewind, etc. are implemented conventionally. The additional functions needed by the present invention are discussed in detail herein. A single video player is created when the user double-clicks on chart data, or selects "Video" from a chart's context menu. The video player is then loaded with the stories that are represented by the chart data object, and the user can watch each of the stories sequentially. Most of the video player's controls behave like conventional VCR and computer video controls, with the exception being the "track forward" and "track backward" buttons, usually only seen on CD player controls. These two buttons allow the user to hop forward (or backward) to the start of the next story. When using a single video player, the user is capable using of the following functions which preferably appear as buttons on a player window:

Play where the video is conventionally played.

Fast-Forward where the video is conventionally moved forward an accelerated rate.

Rewind where the video is conventionally rewound.

Pause where the video is conventionally paused.

Stop where the video is conventionally stopped.

Volume on the audio portion of the video can be controlled.

Mute is where the sound is turned off.

Next-Segment and Previous-Segment access causes the player to instantly jumps to the start of the next or previous segment.

Non-Linear Playback/Scanning operates in two modes. 1) If the video player is loaded with stories that are not chronologically continuous, the player will play/fast-forward/rewind through the stories as if there were no gaps between them. 2) If the video player is loaded with stories that reside in separate files (akin to being on separate videotapes), the player loads and unloads files transparently and play/fast-forward/rewind as if the stories were all on the same tape with no gaps between them. The single video player also has the following user interaction capability.

Single Video Player User-Interactions

| Current State | Interaction | Response | New State |
| --- | --- | --- | --- |
| Stop | Next | Player moves ahead in video to the start of the next story | Stop |
| Play | Next | See above | Play |
| FF/Rewd | Next | See above | Stop |
| Stop | Previous | Player moves back to the start of the current story, or, if less than 2 seconds into the current story, moves back to the start of the previous story | Stop |
| Play | Previous | See above | Play |
| FF/Rewd | Previous | See above | Stop |

Detailed information about the single video player can be obtained from the pseudo-code of the Appendix entitled Pseudo Code for Single Player Events.

A multi-video player (see FIG. 12) is created when the user selects the Newscast Video button and more than one station (Station Buttons) is currently selected for analysis. The multi-video player loads broadcasts from all of the selected stations, and then synchronizes each of them with respect to time. The user can then manipulate each of the videos individually using the controls directly below each window. Control over which video is providing the audio feed is achieved with the speaker buttons directly to the right of each set of video controls. Clicking on a speaker icon gives the associated video player audio control. The lower set of "spanning" controls allow the user to control all of the video players together, playing, fast-forwarding and rewinding while keeping the videos all in sync. If the videos do get out of sync (either by manipulating a single video player or by using the story forward/back buttons on the spanning control, they can be re-synchronized using the sync button (the button displaying a clap-board to the left of the spanning controls). When the sync button is pressed, each of the videos is moved to the time of the video that has audio control. When using a multiple video player, the user is capable of using of the following functions which preferably appear as buttons that are associated with the windows but separate from the windows for the individual players:

All functionality of the single video player.

Ability to play and manipulate n videos simultaneously.

Play, Fast-Forward, Rewind, Pause and Stop all videos together with the push of a single button.

Toggle audio feed between videos.

Synchronize instantly sets each video to the same date and time based on the video that currently has audio control.

Multi-Video Player User-Interactions

Interactions listed for the single player work the same way for the multi-player. Using one of the "spanning controls" the system behaves as if the action was taken on each of the individual players simultaneously. Additional Multi-Player interactions include:

| Current State | Interaction | Response | New State |
| --- | --- | --- | --- |
| Stop | Sync | Each video is moved forward or backward so that it is time-synchronized with the video-player that currently has audio control. | Stop |
| Play | Sync | See above | Stop |
| FF/Rewd | Sync | See above | Stop |
| Stop 1 | Audio-Toggle | Video providing current audio stream is muted, and the video who's audio button was pressed begins providing audio | Stop |
| Stop | Audio-Toggle | See above | Stop |
| Play | Audio-Toggle | See above | Play |
| FF/Rewd | Audio-Toggle | See above | FF/Rewd |

Single and Multi-Video Player Events (non-user-initiated)

For all events listed in the table below, the single player and multi-player behave the same way, the only difference is that the multi-player may be responding to events from more than one video at a time.

| Current State | Event | Response | New State |
| --- | --- | --- | --- |
| Play | Seg. End | If current segment and next segment are continuous (current ends on frame n, and next starts on frame n + 10, do nothing, otherwise, jump to start of next segment, | Play |

| Current State | Event | Response | New State |
|---|---|---|---|
| FF | Seg. End | See above | FF |
| Rewd | Seg Start | If current segment and previous segment are continuous, do nothing, otherwise, jump to the end of the previous segment. | Rewd |
| Play | Video End not seg. list end | Load the video associated with the next segment and move the video to the segment start | Play |
| FF | See above | See above | FF |
| Play | Video End end of seg. list | See above Stop | Play |
| FF | See above | See above | FF |
| Rewd | Vid. St. not start of seg. list | Load the video associated with the previous segment and move the video to the segment end | Rewd |
| Rewd | Vid. St. start of segment list | See above | Stop |

Detailed information about the multi video player can be obtained from the pseudo-code of the Appendix entitled Pseudo Code for Multi-Player Events.

If the user wishes to view the actual text of a broadcast it can be viewed using the manual classifier.

To aid the user in interacting with the processes of the present invention previously discussed, the invention includes additional displays as will be discussed below.

The main screen, is preferably the first screen that the user sees after logging into the system. It allows the user to select the stations, date range and newscasts that he or she wishes to analyze, and select the view that he or she wishes to see. The selection region or toolbar buttons, from left to right represent:

Print—prints the text and or chart(s) from the currently active view to the printer.

Newscast Detail—opens a window showing detailed information about a specific news broadcast.

Newscast Summary View—opens a window showing a summary of the specified newscast(s).

Station Detail—open one or more Station Detail Views, depending on the number of stations selected with the station combo box (see below) or the station buttons (see below)

Station Compare—open the Station Compare View

Video Player—open a Video Player (or Multi-Video Player if more than one station is selected) to show the video from the selected broadcasts Transcript—display the closed-captioned text by opening a text window showing a transcript of the broadcast, labeling each talent transition with the name of the talent who is beginning to speak.

Ratings—open the Ratings View

Query—opens a window that allows the user to define a question to ask the system which can be answered with charts and/or text.

Event Viewer—opens a window that displays the most recently captured events (broadcast anomalies, ratings spikes, etc.).

Figure 14:
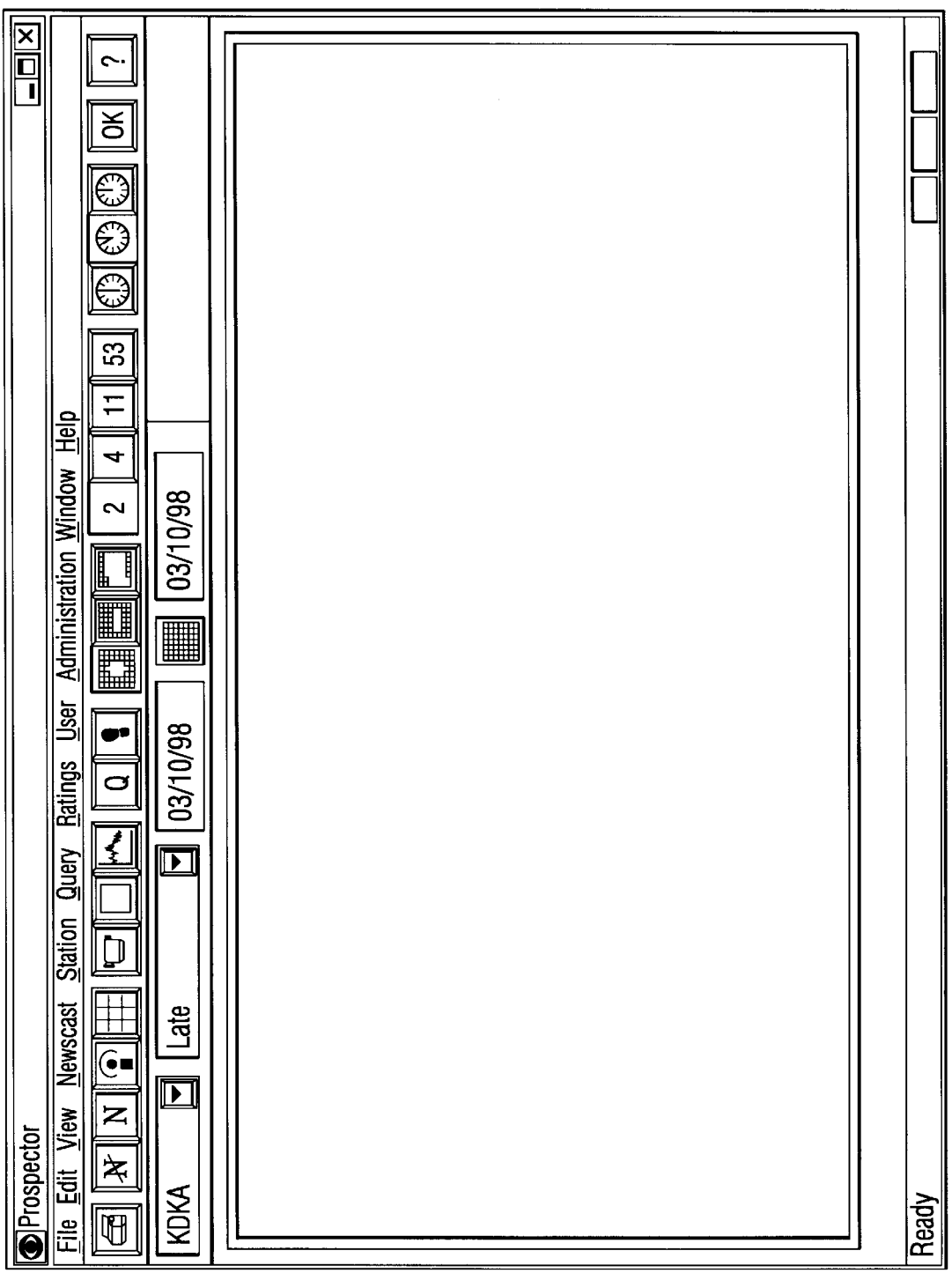
FIG. 14 depicts a main user interface screen.

The next three buttons shown in the main screen of FIG. 14, which look like calendars with one day, one week and one month highlighted, allow the user to quickly change the date range to a single day, week or month, respectively. When one of these buttons is clicked, the Start Date (see below) is updated to be one day/week/month before the End Date (see below).

The next four buttons are the Station Buttons. They show the channel numbers of stations in the local market which are being monitored. The user picks which station(s) he or she wishes to view data from by selecting one or more of these buttons. In the screen shot of FIG. 14, the user has chosen to view data from only channel 2.

The next three buttons are the Broadcast Buttons. Like the station buttons, they represent the broadcasts in the local market which are being monitored. The user picks which broadcasts he or she wishes to analyze by selecting one or more of these buttons. Each button shows a clock face showing a particular ½ hour of time, where blue hands indicate p.m. and orange hands represent a.m. In the screen shot of FIG. 14, the broadcasts buttons represent 6 pm, 11 pm and 12 am, and the user has selected the 11 o'clock news to analyze.

The "OK" button is used to refresh the currently active view when the date, broadcast or station buttons have been updated.

Finally, the help button provides access to the help system (not implemented)

The second row of tools give the user additional control over the stations, broadcasts and dates to analyze. From right to left, the controls are:

Station Combo box—displays the call letters of the stations being monitored and can be used to select a station to analyze. Has the same effect as using the Station Buttons.

Broadcast Combo box—displays the user-assigned names of the broadcasts that are being monitored and can be used to select a broadcast to analyze. Has the same effect as using the Broadcast Buttons.

Start Date—allows the user to enter the first day to analyze.

Date Selection Button—opens the Date Selection Dialog

End Date—allows the user to enter the last day to analyze.

The system of the present invention also provides several menus.

File

Open—not applicable

Close—close the top-most window

Print—prints the text and or chart(s) from the currently active view to the printer.

PrintPreview—opens a window showing the user what the printer would output if the print button/menu option were selected.

Exit—close the application

Edit

Segment—opens a window that allows the user to update/change the data stored in the database for a particular segment.

Keywords—opens a window that allows the user to update/change the data stored in the database for a particular keywords.

Station—opens a window that allows the user to update/change the data stored in the database for a particular station.

Talent—opens a window that allows the user to update/change the data stored in the database for a particular talent.

View
Toolbar—hide/show the toolbar buttons
Statusbar—hide/show the status bar at the bottom of the window
Workbook Mode—toggle the workbook mode (when workbook mode is on, the screen displays a small tab at the bottom of the main window for each window that is currently open (visible in some of the screen shots)
Workbook Icons—toggle the display of graphical icons on the workbook tabs (grayed out if Workbook Mode is off)
Newscast
Detail—see Newscast Detail above
Summary—see Newscast Summary View above.
Video—open a video player (or Multi-Video player if more than one station is selected) to show the video from the selected broadcasts
Transcript—see Transcript above.
Options—opens a dialog box allowing the user to set their preferences for the Newscast views.
List of Newscasts—select the newscasts to analyze (like Broadcast Buttons)
Station
Detail—open one or more Station Detail Views
Compare—open the Station Compare View
Options—opens a dialog box allowing the user to set their preferences for the Station views.
List of Stations—select the station to analyze (like Station Buttons)
Query
Build—see Query above.
Execute—opens a dialog that allows the user to select a previously built query to be executed and the results to be displayed.
Events—see Event Viewer above.
Ratings
Graph—open the Ratings View
Options—opens the chart properties dialog box figure
User
Password—open a dialog box to allow the user to change his or her password
Preferences—opens a dialog box allowing the user to set his/her preferences for using the system (date defaults, chart defaults, etc.).
Administration
Capture Times—open the Capture Times Dialog
Video Attributes—open the Video Attributes Dialog
Window
New Window—not applicable
Cascade—arrange the open windows to overlap
Tile Horizontal—arrange the open windows to fill the workspace by tiling them horizontally
Arrange Icons—arrange the icons of the minimized in an orderly fashion
Tile Vertically—arrange the open windows to fill the workspace by tiling them vertically
Help
About System—open the about box The present invention also provides the ability to control the dates upon which data is analyzed using an interface as depicted in FIG. 22. The date selection dialog allows the user to select the start and end dates for analysis. Clicking on a date in the top calendar (window) establishes a start date, and the lower window establishes the end date, and all of the highlighted dates will be used for analysis. If the user wishes to exclude particular days of the week, the Day Configuration check boxes to the right of the calendars can be used to toggle specific days on or off. The user may also choose to toggle specific days on or off by left-clicking on the date, allowing complete flexibility when choosing dates to analyze.

Figure 15:
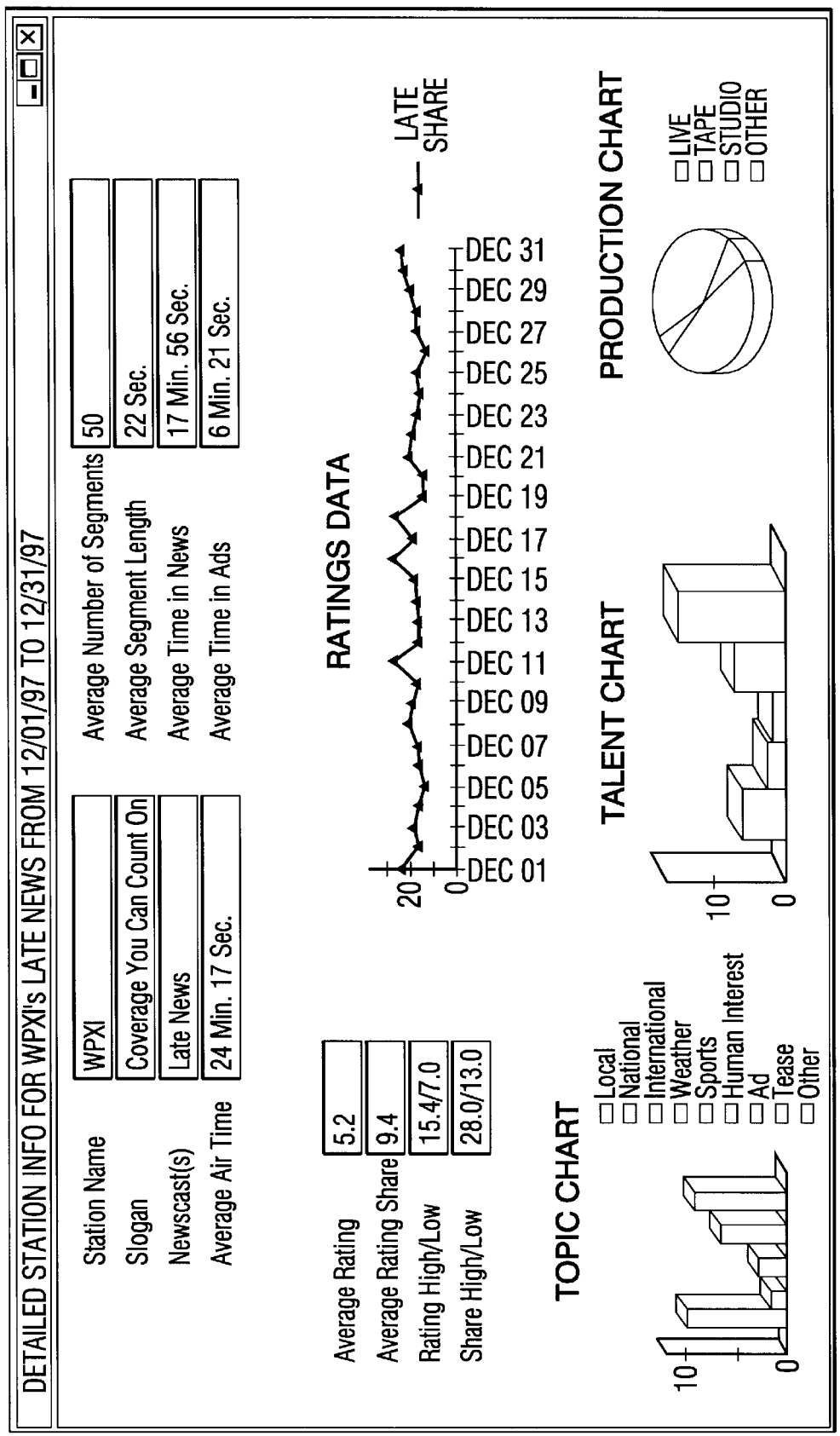
FIG. 15 illustrates a view of information about a particular television station.

A detail view, as illustrated in FIG. 15, is created when the user selects "Detail Info" from a chart's context menu. This view provides the user with a more detailed visual breakdown of the data represented by the data object the user clicked on.

A station detail view, as illustrated in FIG. 15, provides a view of all of the pertinent data for a single station. The topmost fields give information about the station, the broadcast(s) used to generate the data, the ratio of time spent in news to time spend in ads, and story pacing info. The middle of the view provides an overview of the ratings, and the bottom three charts provide the average topic, talent and production breakdown for the station. All of the charts in this view can be updated and customized in the same manor as the other views, and the chart's context menus can be used to obtain more information about specific data.

A segment list, is created when the user selects "Segment List" from a chart's context menu. This view provides a textual breakdown of the segments represented by the data object that the user clicked on. The stories shown in this view can be sorted by any of the columns by clicking on the column header. Additionally, the user can double click on any of the stories, and a video player will open to show the story.

The Capture Time Selection Dialog allows the user to select which times and stations to capture. To select a capture time, the user highlights the time slot on the grid (which behaves like an MS Excel worksheet), and then selects the days to capture and gives the new capture slot a name. Once the information has been specified, the user can click on Add/Update, the new information will be sent to the database and the system will be ready to capture the new broadcasts. Similarly, by highlighting an already existing capture slot, the user can re-name, update or remove capture slots from the system.

The present invention has been described as having certain capabilities and features. The present invention can also include the following additional charting capabilities: 1. The ability to view ratings data and data about a specific topic, talent or production on the same chart—time spent in local news vs. ratings. 2. The ability to provide the facilities to set one chart as a benchmark and have the related charts show their values as deltas from the benchmark value. 3. The ability to use queries to generate charts—charts that show ratings for the days that the lead story was weather related, or charts that show the topic breakdown for broadcasts that lost ratings at the 15 minute break. 4. The ability to generate formatted transcripts for any broadcast. 5. The ability to chart the story or content overlap between the any two (or more) newscasts (i.e. how much of the 11 o'clock news was the same as what we showed at 6 o'clock?). 6. The ability to show timeline charts depicting the specific times in a broadcast that a particular topic/talent/production was used. The invention can include the following additional Video Player Capabilities: a. Skip forward/backward to the next story of a specific topic/talent/production—go to the next "live" story. b. The ability to synchronize multiple players to a particular segment—move all three players to their weather stories. c. The ability to load a multiple video player with segments of a particular topic, talent or production (currently multiple video players can only be loaded with entire broadcasts, not a subset of segments). d. The ability to print any of the charts and views that the software creates.

The present invention has been described with respect to topic, talent and production being broken down into rather broad categories such as topic being broken down into local, national, etc. It is desirable to break stories down into an even finer granularity such as local crime stories, local-fire stories, state-sports-baseball stores, etc. The invention has also been described with respect to using tables of 1, 2 and 3 word phrases. The phrases can also be 4 or more words of desired. To improve the performance and resource utilization characteristics of the system common words such as conjunctions, prepositions and articles can be eliminated when scoring and analyzing. Neglected phrases, that is phrases that have only been encountered once or twice in a year can also be removed to enhance the system. The invention has been described with respect to rescoring segments after they have been combined. That is, a single cycle of counting and rescoring. It is possible for this to be done a number of times. The techniques of the invention can be used to monitor other types of shows (network news, prime time). The invention can further be used to watch the broadcasts all day long and pick out and categorize all of the stations promotional spots ("coming up tonight at 11!"). The user would then be able to do analysis similar to that for the news. Also the invention can be used for categorizing advertisements that run on the monitoring stations, and providing analysis of the ads.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus for analyzing television broadcasts, comprising:
    a capture system capturing a designated television broadcast; and
    an analysis system analyzing the broadcast and determining competitive characteristics of the broadcast;
    wherein said capture system removes meaningless text characters from closed-captioned text of the broadcast, determines a broadcast slot for the broadcast and truncates text lines longer than a predetermined length.

2. An apparatus as recited in claim 1, wherein the competitive characteristics comprise one of broadcast topic, talent and production.

3. An apparatus as recited in claim 1 where said analysis system separates the broadcast into individual stories.

4. An apparatus as recited in claim 1, wherein said analysis system determines the competitive characteristics by comparing spoken text of the broadcast with statistical information accumulated about prior broadcasts.

5. An apparatus as recited in claim 1, further comprising a user interface displaying the competitive characteristics of the broadcast for a user.

6. An apparatus as recited in claim 5, wherein said interface graphically displays the characteristics.

7. An apparatus as recited in claim 5, wherein said interface simultaneously displays the characteristics and the broadcast.

8. An apparatus as recited in claim 5, wherein said interface simultaneously displays the characteristics and ratings data for the broadcast.

9. An apparatus as recited in claim 1, wherein said analysis system scores segments of the closed captioned text, determines whether the segments can be combined and rescores the combined segments.

10. An apparatus as recited in claim 9, wherein said apparatus scores and rescores by comparing the text to a vocabulary table and determining a score table from the vocabulary table and accumulating scores for the text from the score table with the highest score for each classification category becoming a classification for the text.

11. An apparatus as recited in claim 10, further comprising a score table tree of statistical information.

12. An apparatus as recited in claim 1, wherein said capture system comprises a capture machine for each television station being analyzed.

13. An apparatus as recited in claim 12, wherein each capture machine comprises:
    a closed-caption unit receiving capturing closed captioned text for the broadcast; and
    a video/audio capture unit converting a video of the broadcast into digital images and an audio of the broadcast into digital sound.

14. An apparatus for analyzing television broadcasts, comprising:
    a capture system having a capture machine for each television station and capturing designated television broadcasts, each capture machine removing meaningless text characters from closed-captioned text of the broadcasts, determining broadcast slots for the broadcasts and truncating text lines longer than a predetermined length, each capture machine comprising:
        a closed-caption unit receiving capturing the closed captioned text for the broadcast; and
        a video/audio capture unit converting a video of the broadcasts into digital images and an audio of the broadcast into digital sound;
    an analysis system separating the captured broadcasts into individual stories, analyzing the individual stories and determining competitive characteristics of the broadcast by comparing the closed-captioned text of the stories with statistical information accumulated about prior broadcasts including scoring all segments of text, determining whether the segments can be combined and rescoring the combined segments, said analysis system scoring and rescoring by comparing the text to a vocabulary table, determining a score table from the vocabulary table and accumulating scores for the text from the score table with the highest score for each classification category becoming a classification for the text, said competitive characteristics comprising one of broadcast topic, talent and production; and
    a user interface simultaneously graphically displaying the competitive characteristics of the broadcast and the broadcast for a user.

15. An apparatus, comprising:
    storage storing a television broadcast and competitive characteristics of the broadcast;
    a graphical user interface system graphically displaying the competitive characteristics; and
    a capture unit providing the broadcast and the competitive characteristics;
    wherein said system provides an ability to display at least one of broadcast pacing, story length, ratio of news broadcast time to advertisement broadcast time, a list of story segments indicating competitive characteristics of the segments, time related viewer retention data and lead-in related viewer retention data.

16. An apparatus as recited in claim 15, wherein said system displays the broadcast with the characteristics.

17. An apparatus as recited in claim 15, wherein said storage stores ratings data for a broadcast and said system displays the characteristics and the ratings data.

18. An apparatus as recited in claim 15, wherein said storage stores plural broadcasts and corresponding competitive characteristics of the broadcasts and said system simultaneously displays the corresponding characteristics.

19. An apparatus as recited in claim 18, wherein said system simultaneously plays the plural broadcasts.

20. An apparatus as recited in claim 19, wherein the system synchronizes the broadcasts to a one of the broadcasts whose audio is being played.

21. An apparatus as recited in claim 15, wherein said system provides an ability to select at least one of television station, date of capture and time of capture.

22. An apparatus as recited in claim 16, wherein said system performs non-linear playback of video segments.

23. An apparatus, comprising:
a capture system capturing a designated television broadcast, analyzing the broadcast and determining competitive characteristics of the broadcast, said capture system having a capture machine for each television station and capturing designated television broadcasts, each capture machine removing meaningless text characters from closed-captioned text of the broadcasts, determining broadcast slots for the broadcasts and truncating text lines longer than a predetermined length, separating the captured broadcasts into individual stories, analyzing the individual stories and determining competitive characteristics of the broadcast by comparing the closed-captioned text of the stories with statistical information accumulated about prior broadcasts including scoring all segments of text, determining whether the segments can be combined and rescoring the combined segments, said analysis system scoring and rescoring by comparing the text to a vocabulary table, determining a score table from the vocabulary table and accumulating scores for the text from the score table with the highest score for each classification category becoming a classification for the text, and each capture machine comprising:
a closed-caption unit receiving capturing the closed captioned text for the broadcast; and
a video/audio capture unit converting a video of the broadcasts into digital images and an audio of the broadcast into digital sound;
a storage system storing the television broadcasts, competitive characteristics of the broadcasts and ratings data for the broadcasts;
a graphical user interface system graphically displaying the competitive characteristics comprising topic, talent, production, broadcast pacing, story length, ratio of news broadcast time to advertisement broadcast time, time related viewer retention data and lead-in related viewer retention data, playing the stored broadcasts and displaying the ratings data for the broadcasts; and
a storage media storing a process of the capture machine performing the capturing a designated television broadcast and the analyzing the broadcast and the determining competitive characteristics of the broadcast.

24. An apparatus for analyzing television broadcasts including a capture system for capturing designated television broadcasts having competitive characteristics and for receiving ratings data for the broadcasts, characterized by:
a processor for parsing text recovered from said broadcasts into text segments, classifying the text segments according to said competitive characteristics of the broadcasts, and identifying video frames corresponding to the text segments; and
a user interface for presenting the identified video frames and ratings data associated with the identified video frames to a user.

25. An apparatus according to claim 24, further characterized in that said processor includes:
a vocabulary table containing words included in said text; and
a score table containing scores for the words in said vocabulary table.

26. An apparatus according to claim 24, further characterized in that said text includes portions of closed caption text of said broadcast.

27. An apparatus according to claim 24, further characterized in that said processor correlates said competitive characteristics with said ratings data.

28. An apparatus according to claim 24, further characterized in that said competitive characteristics include at least one of: topic, talent and production type of said broadcast.

29. A method for analyzing television broadcasts including the steps of capturing designated television broadcasts and receiving ratings data for said broadcasts, the method characterized by the steps of:
parsing text recovered from said broadcast into text segments;
classifying the text segments according to competitive characteristics of the broadcasts;
identifying video frames corresponding to the text segments; and
presenting the identified video frames and ratings data associated with the identified video frames to a user.

30. The method of claim 29, further characterized in that the step of classifying the text segments according to competitive characteristics of the broadcasts includes the steps of:
comparing the text segments to a stored vocabulary of text segments; and
scoring the text segments in accordance with scores associated with the stored vocabulary of text segments.

31. The method of claim 30, further characterized by the step of:
combining adjacent text segments corresponding to similar competitive characteristics of the broadcasts to produce combined text segments; and
scoring the combined text segments in accordance with scores associated with the stored vocabulary of text segments.

32. The method of claim 29, further characterized by the steps of:
preparsing closed caption text from said broadcasts to create a preprocessed text file; and
using the preprocessed text file in the step of parsing text recovered from said broadcast into text segments.

33. The method of claim 29, further characterized by the step of:
using header information in a closed caption portion of said broadcasts to establish a date and time of capture.

* * * * *